United States Patent
Koga et al.

(10) Patent No.: US 10,788,465 B2
(45) Date of Patent: Sep. 29, 2020

(54) FILTER DEVICE FOR GAS CHROMATOGRAPH AND GAS CHROMATOGRAPH

(71) Applicant: Shimadzu Corporation, Kyoto (JP)

(72) Inventors: Kiyonori Koga, Kyoto (JP); Yasunori Terai, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 79 days.

(21) Appl. No.: 16/094,304

(22) PCT Filed: May 2, 2016

(86) PCT No.: PCT/JP2016/063557
§ 371 (c)(1),
(2) Date: Oct. 17, 2018

(87) PCT Pub. No.: WO2017/191673
PCT Pub. Date: Nov. 9, 2017

(65) Prior Publication Data
US 2019/0137457 A1    May 9, 2019

(51) Int. Cl.
*G01N 30/10* (2006.01)
*G01N 30/16* (2006.01)
(Continued)

(52) U.S. Cl.
CPC ............. *G01N 30/10* (2013.01); *B01D 46/24* (2013.01); *G01N 30/16* (2013.01); *G01N 30/32* (2013.01);
(Continued)

(58) Field of Classification Search
CPC ........ G01N 30/10; G01N 30/16; G01N 30/32; G01N 30/60; G01N 30/6004;
(Continued)

(56) References Cited

U.S. PATENT DOCUMENTS

| | | | |
|---|---|---|---|
| 4,278,453 A * | 7/1981 | Klein | B01D 46/003 285/345 |
| 5,391,221 A | 2/1995 | Fukushima et al. | |
| 6,338,823 B1 | 1/2002 | Furukawa | |

FOREIGN PATENT DOCUMENTS

| | | |
|---|---|---|
| JP | S63-190242 A | 8/1988 |
| JP | 2513388 B2 | 11/1993 |
| JP | 2000-19165 A | 1/2000 |

OTHER PUBLICATIONS

International Search Report and Written Opinion dated Aug. 2, 2016 of corresponding International Application No. PCT/JP2016/063557; 9 pgs.

* cited by examiner

*Primary Examiner* — Robert Clemente
(74) *Attorney, Agent, or Firm* — Maier & Maier, PLLC (57) ABSTRACT

In a main body of a filter apparatus, an internal space A corresponding to a flow path of gas is formed in an annular shape, and a filter material filled in the internal space A is disposed in an annular shape. For this reason, it is possible to keep a cross-sectional area of the filter material large when compared to a case in which the filter material is disposed in an elongated shape, reduce flow path resistance, and keep a speed (linear velocity) of gas passing through the inside of the filter material low. Further, it is possible to improve capturing efficiency of the filter material. In addition, one end edge of a flow path, and flow paths and are formed at one end of the main body.

6 Claims, 5 Drawing Sheets

(51) Int. Cl.
  *G01N 30/60* (2006.01)
  *G01N 30/32* (2006.01)
  *G01N 30/02* (2006.01)
  *B01D 46/24* (2006.01)

(52) U.S. Cl.
  CPC ......... *G01N 30/60* (2013.01); *G01N 30/6004* (2013.01); *G01N 2030/025* (2013.01); *G01N 2030/324* (2013.01)

(58) Field of Classification Search
  CPC ....... G01N 2030/025; G01N 2030/324; B01D 46/24; B01D 46/2403; B01D 46/2411
  See application file for complete search history.

FIG. 1

FILTER DEVICE FOR GAS CHROMATOGRAPH AND GAS CHROMATOGRAPH

FIELD

The present invention relates to a filter apparatus for a gas chromatograph in which a flow path through which gas passes is formed and the flow path is filled with a filter material, and gas chromatograph including the filter apparatus.

BACKGROUND

Conventionally, a filter apparatus disposed in a flow path of gas flowing in a gas chromatograph has been used. The filter apparatus includes a main body having a flow path formed therein and a filter interposed in the flow path. Gas flowing through the gas chromatograph flows into the flow path of the main body of the filter apparatus. When gas passes through the flow path in the main body, various components in the gas are collected (captured) by the filter.

For example, a filter apparatus disposed in a split flow path of a gas chromatograph has been known as such a filter apparatus (for example, see Patent Document 1 below).

Figure 5:
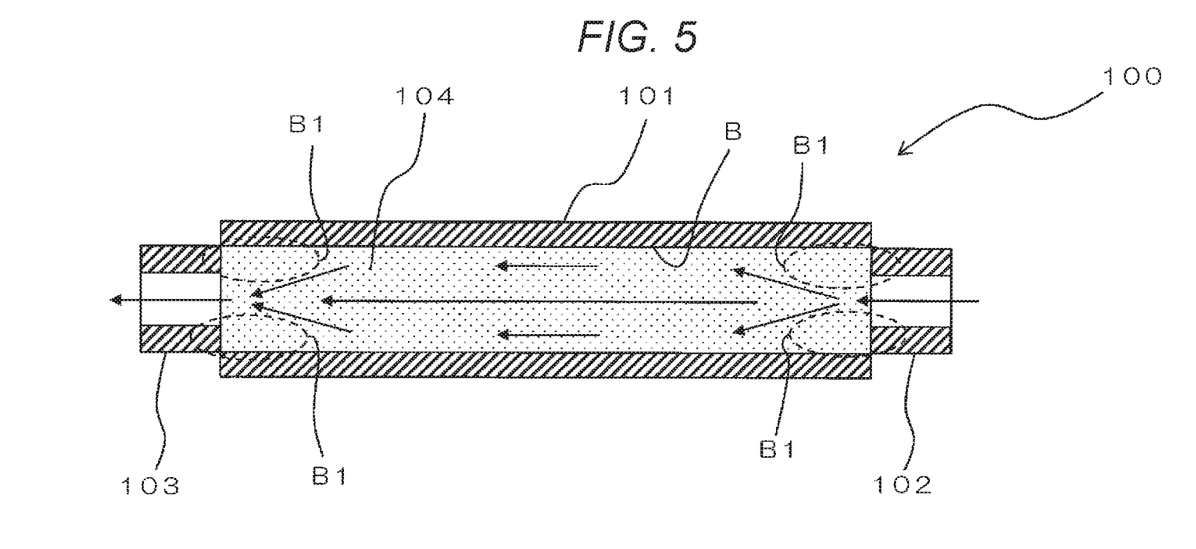
FIG. 5 is a cross-sectional view illustrating a configuration of a conventional filter apparatus for a gas chromatograph.

FIG. 5 is a cross-sectional view illustrating a configuration of a conventional filter apparatus 100.

The filter apparatus 100 is an apparatus disposed in a split flow path of a gas chromatograph, and includes a main body 101, an inflow side connecting portion 102, an outflow side connecting portion 103, and a filter 104.

The main body 101 is formed in an elongated tubular shape. The inflow side connecting portion 102 is connected to one end of the main body 101. The inflow side connecting portion 102 is formed in a tubular shape having a smaller diameter than that of the main body 101. The outflow side connecting portion 103 is connected to the other end of the main body 101. The outflow side connecting portion 103 is formed in a tubular shape having a smaller diameter than that of the main body 101. Each of the outflow side connecting portion 103 and the inflow side connecting portion 102 is connected to an external flow path member. The filter 104 is filled in an internal space B of the main body 101.

In the gas chromatograph, a sample is vaporized in a sample vaporizing chamber, and a carrier gas is introduced into the sample vaporizing chamber. Further, a part of a gas (a mixed gas of the carrier gas and a sample gas) in the sample vaporizing chamber is discharged to the outside by passing through the split flow path. Here, the gas passing through the split flow path is introduced into the filter apparatus 100. Specifically, the gas passing through the split flow path passes through the inside of the inflow side connecting portion 102 and flows into the main body 101. Then, after passing through the internal space B of the main body 101, the gas passes through the inside of the outflow side connecting portion 103 and is discharged to the outside. In this instance, a sample component contained in the gas is captured by the filter 104 in the main body 101.

CITATION LIST

Patent Document

Patent Document 1: Japanese Patent No. 2,513,388

SUMMARY

In the conventional filter apparatus 100 described above, the internal space B is formed to be elongated. Therefore, a cross-sectional area of the filter 104 filled in the internal space B becomes small and flow path resistance increases, which results in a defect that stability at the time of analysis is affected. In addition, in the conventional filter apparatus 100, the gas linearly moves within the apparatus. Therefore, the gas is likely to flow through the inside (center) in the apparatus. As a result, a dead space through which gas is difficult to pass is easily generated in the apparatus. Specifically, in the internal space B of the main body 101, a space B1 around a boundary between the main body 101 and the inflow side connecting portion 102 and around a boundary between the main body 101 and the outflow side connecting portion 103 corresponds to the dead space through which the gas is difficult to pass. For this reason, in the filter 104 filled in the space B1, it is difficult to capture the sample component. As described above, in the conventional filter apparatus 100, since a portion in which the sample component is difficult to capture is generated in the filter 104, a defect that capturing efficiency of the filter 104 deteriorates occurs.

In addition, in the filter apparatus 100, both ends of the main body 101 are provided with connecting portions (the inflow side connecting portion 102 and the outflow side connecting portion 103), respectively. For this reason, a large space is required for installation. In addition, since there are two connecting places with respect to the external flow path member (since the number of connecting places increases), a possibility of gas leakage increases. When the gas leaks from these connecting places, an analysis operation in the gas chromatograph becomes unstable.

The invention has been made in view of the above circumstances, and an object of the invention is to provide a filter apparatus for a gas chromatograph capable of realizing a stable analysis operation in the gas chromatograph and efficiently capturing a component to be captured contained in a gas, and the gas chromatograph. In addition, another object of the invention is to provide a filter apparatus for a gas chromatograph capable of realizing space saving, and the gas chromatograph.

(1) A filter apparatus for a gas chromatograph according to the invention includes a main body and a filter material. A first flow path and an annular second flow path provided on an outer circumferential side of the first flow path are formed inside the main body. The filter material is filled in the second flow path in the main body. An inlet and an outlet are formed at one end of the main body, and a gas flowing into the main body from the inlet passes through one of the first flow path or the second flow path, is directed to a side of the other end of the main body, passes through the other one of the first flow path or the second flow path from the other end, and is guided to the outlet.

According to such a configuration, the second flow path in the main body is formed in an annular shape. For this reason, the filter material filled in the second flow path is disposed in an annular shape. In addition, the gas passes through the second flow path after the gas flows in from the inlet until the gas is directed to the outlet. A component to be captured contained in the gas passing through the second flow path is captured by the filter material filled in the second flow path.

For this reason, it is possible to keep a cross-sectional area (cross-sectional area in a direction orthogonal to an inflow direction of the gas) of the filter material large when compared to a case in which the filter material is disposed in an elongated shape, reduce flow path resistance, and keep a speed (linear velocity) of gas passing through the inside of the filter material low.

As a result, it is possible to efficiently capture the component to be captured contained in the gas by the filter material. In addition, it is possible to suppress an increase in pressure of gas passing through the inside of the main body, thereby realizing a stable analysis operation in the gas chromatograph.

In addition, the inlet and the outlet are formed at the one end of the main body.

For this reason, connecting places with respect to another member (flow path member, etc.) forming the flow path of the gas can be brought together at the one end of the main body.

As a result, a space necessary to install the apparatus may be kept small, and space saving may be realized.

Further, it is possible to suppress the number of connecting places with respect to the other member forming the flow path of the gas at a necessary minimum, and to decrease a possibility that gas will leak from the connecting place. Further, it is possible to realize a stable analysis operation in the gas chromatograph.

That is, according to the filter apparatus for the gas chromatograph according to the invention, it is possible to realize a stable analysis operation in the gas chromatograph, and to efficiently capture the component to be captured contained in the gas. In addition, according to the filter apparatus for the gas chromatograph according to the invention, it is possible to realize space saving.

(2) In addition, the gas flowing into the main body from the inlet may pass through the first flow path, be directed to the side of the other end of the main body, be directed in a radial direction from a plurality of communication holes at the other end, spout to the second flow path, pass through the second flow path, and be directed to the outlet.

According to such a configuration, the gas flows through the first flow path corresponding to a center side in the main body, and then passes through the second flow path corresponding to an outside in the main body by passing through the plurality of communication holes to make a U-turn.

For this reason, it is possible to cause the gas in the second flow path to flow to diffuse.

As a result, it is possible to suppress generation of a dead space through which gas does not pass in the second flow path, and to efficiently capture the component to be captured contained in gas by the filter material.

(3) In addition, the filter apparatus for the gas chromatograph may further include a seal member. The seal member is provided at the one end of the main body to surround and seal an outside of the inlet and the outlet.

According to such a configuration, it is possible to efficiently seal the inlet and the outlet by the seal member.

(4) In addition, at least a part of an outer peripheral surface of the main body may be formed to be transparent or translucent.

According to such a configuration, it is possible to visually recognize the filter material in the main body from the outside.

For this reason, when the filter material is contaminated due to long-term use of the apparatus, it is possible to check a state of the filter material from the outside without disassembling the apparatus.

As a result, it is possible to easily confirm a replacement time of the filter material.

(5) A gas chromatograph according to the invention includes the filter apparatus for the gas chromatograph, an inflow path, and an outflow path. The inflow path is connected to the inlet. The outflow path is connected to the outlet.

According to such a configuration, it is possible to efficiently capture the component to be captured contained in the gas flowing through the inside of the gas chromatograph by the filter apparatus for the gas chromatograph.

(6) In addition, the inflow path and the outflow path may be included in a split flow path.

According to such a configuration, it is possible to efficiently capture a sample component contained in gas flowing through the split flow path by the filter apparatus for the gas chromatograph.

According to the invention, the second flow path in the main body is formed in an annular shape, and the filter material filled in the second flow path is disposed in an annular shape. For this reason, it is possible to increase a cross-sectional area of the filter material, reduce flow path resistance, and efficiently capture the component to be captured contained in the gas by the filter material. In addition, according to the invention, it is possible to bring together connecting places with respect to an external member forming a flow path of the gas at one end of the main body. For this reason, it is possible to keep a space necessary to install the apparatus small, and to realize space saving. Further, it is possible to suppress the number of connecting places with respect to the external member at a necessary minimum, and to decrease a possibility that gas will leak from the connecting place. Further, it is possible to realize a stable analysis operation in the gas chromatograph.

DETAILED DESCRIPTION

Figure 1:
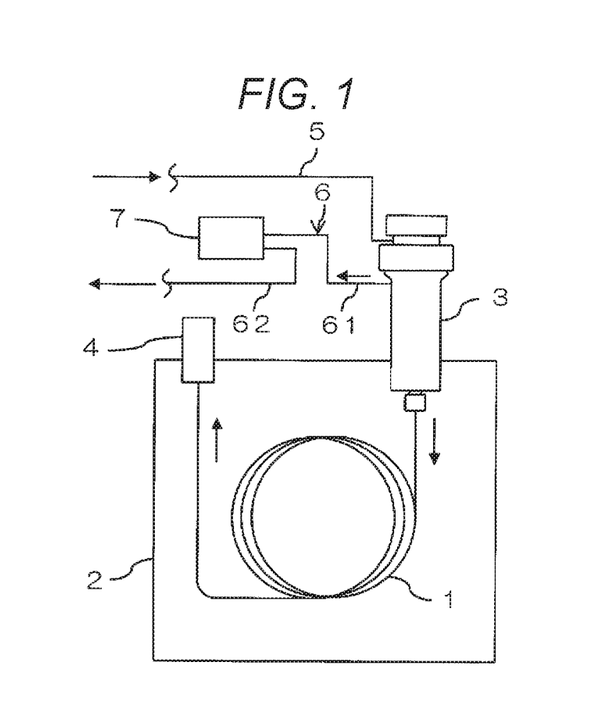
FIG. 1 is a schematic diagram illustrating a configuration example of a gas chromatograph according to an embodiment of the invention.

FIG. 1 is a schematic diagram illustrating a configuration example of a gas chromatograph according to an embodiment of the invention. This gas chromatograph is for performing analysis by supplying a sample gas together with a carrier gas into a column 1, and includes a column oven 2, a sample introducing portion 3, a detector 4, a filter apparatus 7, etc. in addition to the column 1.

For example, the column 1 includes a capillary column. The column 1 is accommodated in the column oven 2.

The column oven 2 is for heating the column 1, and appropriately drives a heater and a fan (not illustrated) at the time of analysis.

The sample introducing portion 3 is for introducing a carrier gas and a sample gas into the column 1, and a sample vaporizing chamber (not illustrated) is formed therein. A liquid sample is injected into this sample vaporizing chamber, and a sample vaporized in the sample vaporizing chamber is introduced into the column 1 together with the carrier gas. In addition, a gas supply flow path 5 and a split flow path 6 communicate with the sample vaporization chamber.

The gas supply flow path 5 is a flow path for supplying the carrier gas into the sample vaporizing chamber of the sample introducing portion 3.

The split flow path 6 is a flow path for discharging a part of a gas (a mixed gas of the carrier gas and the sample gas) in the sample vaporizing chamber to the outside at a predetermined split ratio when the carrier gas and the sample gas are introduced into the column 1 by a split introduction method. The split flow path 6 includes an inflow path 61 and an outflow path 62.

For example, the detector 4 includes a hydrogen flame ionization detector (FID) or a flame photometric detector (FPD). The detector 4 successively detects respective sample components contained in the carrier gas introduced from the column 1.

The filter apparatus 7 is disposed to be interposed in the split flow path 6. The filter apparatus 7 is an apparatus for capturing a sample component contained in gas passing through the split flow path 6, and is an example of a filter apparatus for a gas chromatograph. In the split flow path 6, the inflow path 61 is positioned on an upstream side of the filter apparatus 7, and the outflow path 62 is positioned on a downstream side of the filter apparatus 7 in a gas movement direction.

When a sample is measured in this gas chromatograph, a sample to be analyzed is injected into the sample introducing portion 3. The sample is vaporized in the sample vaporizing chamber. In addition, the carrier gas is supplied to the sample vaporizing chamber of the sample introducing portion 3 via the gas supply flow path 5.

The sample vaporized in the sample vaporizing chamber is introduced into the column 1 together with the carrier gas. The respective sample components contained in the sample are separated in a process of passing through the inside of the column 1 and successively introduced to the detector 4.

In the detector 4, the respective sample components contained in the carrier gas introduced from the column 1 are successively detected. Then, a chromatogram is generated based on a detection result in the detector 4.

In this instance, a part of the gas (the mixed gas of the carrier gas and the sample gas) in the sample vaporizing chamber of the sample introducing portion 3 is discharged to the outside from the split flow path 6 at a predetermined split ratio. Specifically, a part of the gas in the sample vaporizing chamber of the sample introducing portion 3 passes through the inflow path 61 of the split flow path 6, and then flows into the filter apparatus 7. Then, when the gas passes through the inside of the filter apparatus 7, the sample component contained in the gas is captured by the filter apparatus 7. The gas passing through the inside of the filter apparatus 7 is discharged to the outside from the outflow path 62 of the split flow path 6.

Figure 2:
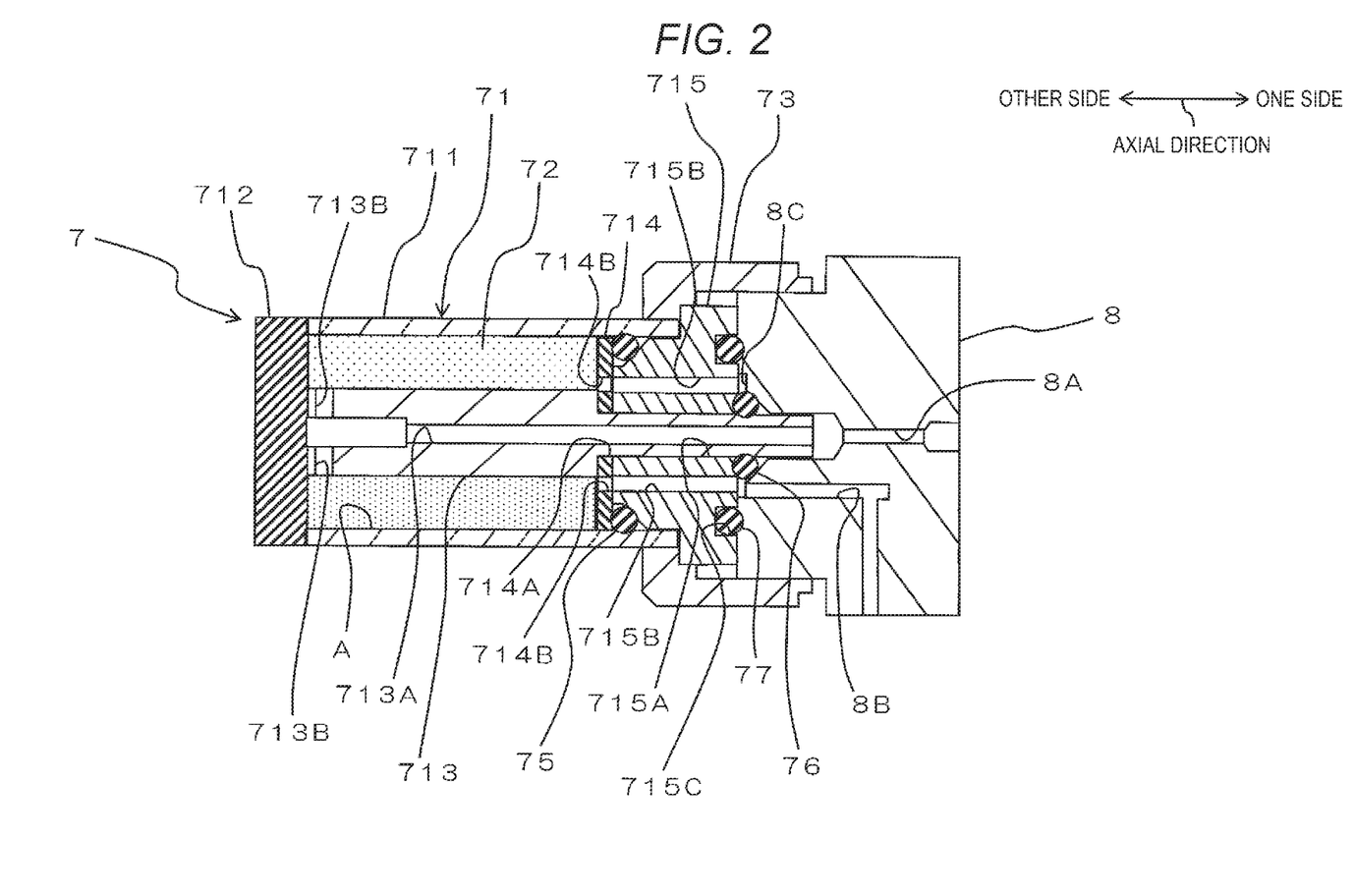
FIG. 2 is a cross-sectional view illustrating a configuration of a filter apparatus of the gas chromatograph of FIG. 1.

FIG. 2 is a cross-sectional view illustrating a configuration of the filter apparatus 7.

The filter apparatus 7 includes a main body 71, a filter material 72, and a nut 73.

The main body 71 is a member in which the flow path in the filter apparatus 7 is formed, and is formed in a hollow cylindrical shape. The main body 71 includes a tubular portion 711, a bottom portion 712, a shaft 713, an inner lid 714, and an outer lid 715.

The tubular portion 711 is included in an outer peripheral portion (outer peripheral surface) of the main body 71. The tubular portion 711 is formed in a cylindrical shape. For example, the tubular portion 711 is made of glass and formed to be transparent or translucent. The outer lid 715 is provided at one end (left side in FIG. 2) of the tubular portion 711, and a bottom portion 712 is provided at the other end (left side in FIG. 2) of the tubular portion 711.

Hereinafter, a description will be given on the assumption that a right side in FIG. 2 is one side (one end side), the left side in FIG. 2 is the other side (the other end side), and a left-right direction in FIG. 2 is an axial direction.

For example, the bottom portion 712 is made of metal and formed in a disc shape. The bottom portion 712 is attached to the tubular portion 711 to cover the other end of the tubular portion 711.

The shaft 713 is disposed inside the tubular portion 711. The shaft 713 is formed in a cylindrical shape extending in the axial direction, and the other end thereof is attached to the bottom portion 712. The shaft 713 is formed such that a diameter of one side is small and a diameter of the other side is large with a central portion as a boundary. A flow path 713A and a plurality of communication holes 713B are formed in the shaft 713.

The flow path 713A penetrates a center portion of the shaft 713 in the axial direction. The flow path 713A is an example of a first flow path. In addition, one end edge of the flow path 713A is an example of an inlet.

The communication holes 713B are formed at the other end of the shaft 713. The communication holes 713B extend in a radial direction of the shaft 713, and disposed at equal intervals in a circumferential direction of the shaft 713. One end of each of the communication holes 713B is continuous with the flow path 713A, and the other end thereof is continuous with an external space of the shaft 713. In this example, four communication holes 713B are formed and disposed at intervals of about 90° in the circumferential direction.

The inner lid 714 is disposed on an inside of one side portion of the tubular portion 711. The inner lid 714 is formed in a disc shape. An outer diameter of the inner lid 714 is slightly smaller than an inner diameter of the tubular portion 711. An opening 714A and a plurality of flow paths 714B are formed in the inner lid 714.

The opening 714A penetrates a central portion of the inner lid 714 in the axial direction.

The flow paths 714B penetrate a radially outer portion of the opening 714A in the inner lid 714 in the axial direction. The flow paths 714B are disposed at equal intervals in the circumferential direction. In this example, four flow paths 714B are formed and disposed at intervals of about 90° in the circumferential direction.

The shaft 713 (an axially central portion of the shaft 713) is inserted into the opening 714A of the inner lid 714. In this way, an annular internal space A surrounded by the other end surface of the inner lid 714, an outer peripheral surface of the shaft 713, one end surface of the bottom portion 712, and an inner peripheral surface of the tubular portion 711 is formed inside the main body 71.

The outer lid 715 is attached to the tubular portion 711 to cover one end of the tubular portion 711. The outer lid 715 is disposed on one side of the inner lid 714. The outer lid 715 is formed in a cylindrical shape extending in the axial direction. Specifically, the outer lid 715 is formed such that a diameter of one side is large and a diameter of the other side is small with a central portion as a boundary. One side of the outer lid 715 is disposed outside the tubular portion 711, and the other side thereof is disposed inside the tubular portion 711. The other end surface of the outer lid 715 comes into contact with the inner lid 714. A first seal member 75 is disposed between the outer lid 715 and the inner lid 714.

The first seal member 75 is an O-ring made of rubber, and seals between the outer lid 715 and the tubular portion 711.

Figure 3:
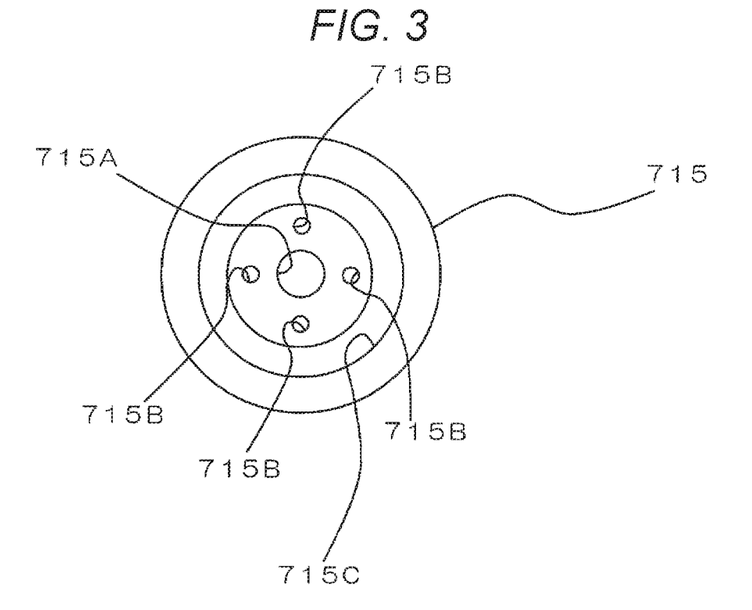
FIG. 3 is a front view of an outer lid of the filter apparatus of FIG. 2.

FIG. 3 is a front view of the outer lid 715, and illustrates a state in which the outer lid 715 is viewed from one side (right side) in FIG. 2.

As illustrated in FIG. 2 and FIG. 3, an opening 715A, a plurality of flow paths 715B, and a groove 715C are formed in the outer lid 715.

The opening 715A penetrates a central portion of the outer lid 715 in the axial direction. One part of the shaft 713 is inserted into the opening 715A. A second seal member 76 is provided at a boundary portion between an edge of the opening 715A in the outer lid 715 and the shaft 713.

The second seal member 76 is an O-ring made of rubber, and seals between the edge of the opening 715A in the outer lid 715 and the shaft 713.

The flow paths 715B penetrate a radially outer portion of the opening 715A in the outer lid 715 in the axial direction. The flow paths 715B are disposed at equal intervals in the circumferential direction. When viewed in the axial direction, each of the flow paths 715B overlaps each of the flow paths 714B of the inner lid 714. In this example, four flow paths 715B are formed and disposed at intervals of about 90° in the circumferential direction. The flow paths 714B and 715B are an example of an outlet. In addition, the internal space A is an example of a second flow path. The internal space A is disposed on an outer peripheral side of the flow path 713A of the shaft 713 and formed in an annular shape.

The groove 715C is formed at one end (on one end surface) of the outer lid 715. The groove 715C has an annular shape and is formed to be recessed from the one end surface of the outer lid 715 toward an inner side (the other side). In the radial direction, the groove 715C is positioned outside the opening 715A and the plurality of flow paths 715B. As illustrated in FIG. 2, a third seal member 77 is fit into the groove 715C.

The third seal member 77 is an O-ring made of rubber.

The filter material 72 is filled in the internal space A. As described above, the internal space A is formed in an annular shape. For this reason, the filter material 72 filled in the internal space A is disposed in an annular shape. For example, the filter material 72 is made of a silica gel or activated carbon.

The nut 73 is disposed outside the outer lid 715 in the radial direction. For example, the nut 73 is made of metal and formed in a cylindrical shape extending in the axial direction. A thread groove (not illustrated) is formed on an inner peripheral surface of one end of the nut 73. The other end of the nut 73 corresponds to an annular flange portion projecting inward in the radial direction.

The filter apparatus 7 is attached to a fixed block 8 and used. The fixed block 8 is a flow path member disposed in the split flow path 6.

The fixed block 8 is formed in a cylindrical shape extending in the axial direction. A screw thread (not illustrated) is formed on an outer peripheral surface of the other end of the fixed block 8. A flow path 8A, a flow path 8B, and a depression 8C are formed in the fixed block 8.

The flow path 8A penetrates a central portion of the fixed block 8 in the axial direction. The flow path 8A is formed such that an inner diameter thereof differs depending on the position in the axial direction.

The flow path 8B is formed on a radially outer portion of the flow path 8A in the fixed block 8. The flow path 8B extends to one side from the other end surface of the fixed block 8, and then extends in the radial direction of the fixed block 8. One end (radially outer end) and the other end of the flow path 8B are continuous with an external space of the fixed block 8.

The depression 8C is formed at a radially central portion of the other end (the other end surface) of the fixed block 8. The depression 8C is formed to be recessed from the other end surface of the fixed block 8 toward an inner side (one side). The depression 8C is continuous with the flow path 8A and the flow path 8B.

Further, when the filter apparatus 7 is attached to the fixed block 8, first, the filter apparatus 7 is disposed on the other side of the fixed block 8. In this instance, the filter apparatus 7 is disposed such that the other end surface of the fixed block 8 comes into contact with the one end surface of the outer lid 715. In addition, one end of the shaft 713 is inserted into the other end of the flow path 8A of the fixed block 8. In addition, one end edge (inner peripheral surface of one end) of the nut 73 comes into contact with the other end edge (outer peripheral surface of the other end) of the fixed block 8.

From this state, the nut 73 is fastened to the fixed block 8. In this way, the outer lid 715 is pressed against the fixed block 8 by the nut 73. Further, a space between the one end surface of the outer lid 715 and the other end surface of the fixed block 8 is sealed by the third seal member 77.

In this way, the filter apparatus 7 is attached to the fixed block 8.

Figure 4:
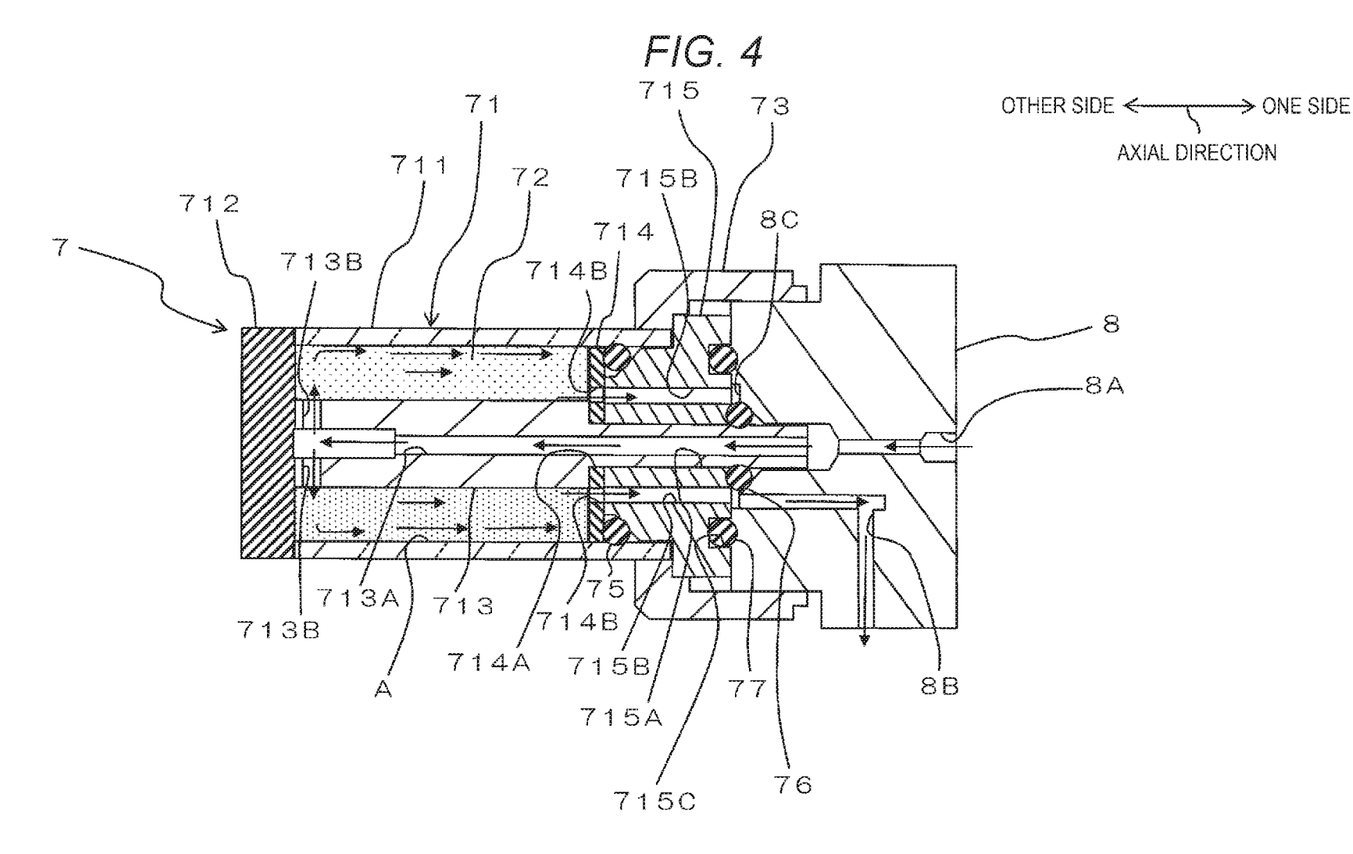
FIG. 4 is a cross-sectional view illustrating a flow of gas in the filter apparatus of FIG. 2.

FIG. 4 is a cross-sectional view illustrating a flow of gas in the filter apparatus 7.

The flow path 8A of the fixed block 8 is connected to the inflow path 61 (see FIG. 1) of the split flow path 6, and the flow path 8B of the fixed block 8 is connected to the outflow path 62 of the split flow path 6. In addition, as described above, the filter apparatus 7 is attached to the fixed block 8.

When an analysis operation is started in the gas chromatograph, a sample is introduced to the sample introducing portion 3, and a carrier gas is supplied thereto, a part of a gas (a mixed gas of a carrier gas and a sample gas) in the sample introducing portion 3 passes through the inflow path 61, and flows to the flow path 8A of the fixed block 8.

Gas flowing into the flow path 8A passes through the inside of the flow path 8A, and then flows into the flow path 713A of the shaft 713 from one end edge (one side). Then, the gas flows through the flow path 713A toward the other side and reaches the other end of the flow path 713A. Further, the gas is blown to the one end surface of the bottom portion 712, spreads in the radial direction, and flows into each of the communication holes 713B of the shaft 713.

The gas passing through each of the communication holes 713B flows (spouts) into the internal space A, is blown onto the inner peripheral surface of the tubular portion 711, spreads in the axial direction, and diffuses into the internal space A. Then, the gas in the internal space A flows toward one side while diffusing, and reaches one end of the internal space A.

In this instance, the gas flowing in the internal space A is likely to flow on a radially outer side in the internal space A. Further, a sample component contained in the gas is captured by the filter material 72.

Then, the gas passes through the flow path 714B of the inner lid 714 and flows into the flow path 715B of the outer lid 715 from the other side. The gas flowing into the flow path 715B passes through the flow path 715B, and then flows into the depression 8C of the fixed block 8.

The gas flowing into the depression 8C of the fixed block 8 flows into the flow path 8B of the fixed block 8. Then, the gas passing through the flow path 8B passes through the outflow path 62 of the split flow path 6 and is discharged to the outside.

In this way, in the filter apparatus 7, the gas flows into the internal space A through each communication hole 713B of the shaft 713 to make a U-turn after linearly flowing through the flow path 713A of the shaft 713. In this instance, gas diffuses and uniformly flows through the internal space A. Thereafter, the gas passes through the flow path 714B of the inner lid 714, the flow path 715B of the outer lid 715, the depression 8C of the fixed block 8, and the flow path 8B of the fixed block 8, and then is discharged to the outside from the outflow path 62 of the split flow path 6.

In addition, a space between the outer lid 715 of the main body 71 and the fixed block 8 is sealed by the third seal member 77. The third seal member 77 surrounds an outside of the flow path 713A of the shaft 713 and the flow path 715B of the outer lid 715. For this reason, gas flowing therethrough is inhibited from leaking to the outside by the third seal member 77.

(1) In the present embodiment, as illustrated in FIG. 4, inside the main body 71, the internal space A corresponding to a flow path (second flow path) of gas is formed in an annular shape. For this reason, the filter material 72 filled in the internal space A is disposed in an annular shape. Further, gas passes through the internal space A after the gas flows into the filter apparatus 7 until the gas flows out from the filter apparatus 7. A sample component contained in the gas passing through the internal space A is captured by the filter material 72 filled in the internal space A.

For this reason, it is possible to keep a cross-sectional area (cross-sectional area in a direction orthogonal to the axial direction) of the filter material 72 large when compared to a case in which the filter material 72 is formed in an elongated shape, reduce flow path resistance, and keep a speed (linear velocity) of gas passing through the inside of the filter material 72 low.

As a result, it is possible to efficiently capture the sample component contained in the gas by the filter material 72. In addition, it is possible to suppress an increase in pressure of gas passing through the inside of the main body 71, thereby realizing a stable analysis operation in the gas chromatograph.

In addition, the one end edge of the flow path 713A of the shaft 713 corresponding to an inlet and the flow paths 714B and 715B corresponding to outlets are formed at one end of the main body 71.

For this reason, connecting places with respect to the fixed block 8 can be brought together at the one end of the main body 71.

As a result, in the gas chromatograph, a space necessary to install the filter apparatus 7 may be kept small, and space saving may be realized.

Further, it is possible to suppress the number of connecting places with respect to the fixed block 8 at a necessary minimum (one connecting place), and to decrease a possibility that gas will leak from the connecting place. Further, it is possible to realize a stable analysis operation in the gas chromatograph. In addition, since the number of connecting places is small (one place), workability of maintenance, etc. can be improved. Further, since the number of connecting parts is small, it is possible to reduce manufacturing cost.

That is, according to the filter apparatus 7, it is possible to efficiently capture a sample component contained in gas while realizing a stable analysis operation in the gas chromatograph. In addition, according to the filter apparatus 7, it is possible to realize space saving.

(2) In addition, in the present embodiment, as illustrated in FIG. 4, gas flowing into the main body 71 flows through the flow path 713A of the shaft 713, is directed to the other end side of the shaft 713 (main body 71), is directed in the radial direction from each communication hole 713B of the shaft 713, spouts to the internal space A, and is guided to the outside of the main body 71 through the internal space A.

That is, the gas flowing into the main body 71 flows through the flow path 713A of the shaft 713 positioned on a center side (inside) in the main body 71, and then passes through the internal space A positioned on the outside in the main body 71 by passing through each communication hole 713B of the shaft 713 to make a U-turn.

For this reason, it is possible to cause the gas in the internal space A to flow to diffuse.

As a result, it is possible to suppress generation of a dead space through which gas does not pass in the internal space A, and to efficiently capture a sample component contained in gas by the filter material 72.

(3) In addition, in the present embodiment, as illustrated in FIG. 4, the third seal member 77 is provided at the one end of the main body 71. The third seal member 77 surrounds an outside of the one end edge of the flow path 713A of the shaft 713, the flow path 714B of the inner lid 714, and the flow path 715B of the outer lid 715, and seals between the outer lid 715 of the main body 71 and the fixed block 8.

For this reason, it is possible to efficiently seal the one end edge of the flow path 713A of the shaft 713 corresponding to the inlet and the flow paths 714B and 715B corresponding to the outlets by the third seal member 77.

(4) In addition, in the present embodiment, as illustrated in FIG. 4, the tubular portion 711 of the main body 71 is made of glass and formed to be transparent or translucent.

For this reason, it is possible to visually recognize the filter material 72 inside the main body 71 from the outside.

As a result, when the filter material 72 is contaminated due to long-term use of the filter apparatus 7, it is possible to check a state of the filter material 72 without disassembling the filter apparatus 7. In particular, in the case of a configuration in which gas easily flows on a radially outer side in the internal space A as in the present embodiment, a radially outer side in the filter material 72 is easily contaminated, and thus contamination can be easily confirmed.

Therefore, it is possible to easily confirm a replacement time of the filter material 72.

(5) In addition, in the present embodiment, as illustrated in FIG. 1, the filter apparatus 7 is interposed in the split flow path 6.

For this reason, it is possible to efficiently capture a sample component contained in gas flowing through the split flow path 6 by the filter apparatus 7.

In the above description, in the main body 71, after gas flows through the flow path 713A of the shaft 713, the gas passes through each communication hole 713B of the shaft 713, and is guided to the outside of the main body 71 through the internal space A. However, in the main body 71, the gas may flow in the opposite direction. That is, after gas flows into the flow path 715B of the outer lid 715 from one end side and flows through the inside of the internal space A, the gas may pass through each communication hole 713B of the shaft 713 and be guided to the outside of the main body 71 through the flow path 713A of the shaft 713.

In addition, in the above description, the filter apparatus 7 is interposed in the split flow path 6 in the gas chromatograph. However, the filter apparatus 7 may be used by being interposed in another flow path in the gas chromatograph. For example, the filter apparatus 7 may be used by being interposed in a flow path between the gas chromatograph and a cylinder for supplying a carrier gas. Alternatively, the filter apparatus 7 may be used by being interposed in a flow path between the sample introducing portion 3 and a flow controller. Alternatively, the filter apparatus 7 may be used by being interposed in a vent flow path in the gas chromatograph.

In addition, in the above description, the main body 71 of the filter apparatus 7 includes the tubular portion 711, the bottom portion 712, the shaft 713, the inner lid 714, and the outer lid 715. However, the main body 71 is not limited to such a configuration. At least a part of the configuration may be omitted, or at least a part of the configuration may be integrally configured.

The invention claimed is:

1. A filter apparatus for a gas chromatograph, the filter apparatus comprising:
 a main body in which a first flow path and an annular second flow path provided on an outer circumferential side of the first flow path are formed; and
 a filter material filled in the second flow path in the main body,
 wherein an inlet and an outlet are formed at one end of the main body,
 a bottom portion covering the other end of the main body is formed at the other end,
 a gas flowing into the main body from the inlet passes through one of the first flow path or the second flow path, is directed to a side of the other end of the main body, passes through the other one of the first flow path or the second flow path from the other end, and is guided to the outlet, and
 the bottom portion suppresses passage of the gas.

2. The filter apparatus for a gas chromatograph according to claim 1, wherein the gas flowing into the main body from the inlet passes through the first flow path, is directed to the side of the other end of the main body, is directed in a radial direction from a plurality of communication holes at the other end, spouts to the second flow path, passes through the second flow path, and is directed to the outlet.

3. The filter apparatus for a gas chromatograph according to claim 1, further comprising
 a seal member provided at the one end of the main body to surround and seal an outside of the inlet and the outlet.

4. The filter apparatus for a gas chromatograph according to claim 1, wherein at least a part of an outer peripheral surface of the main body is formed to be transparent or translucent.

5. A gas chromatograph comprising:
 the filter apparatus for the gas chromatograph according to claim 1;
 an inflow path connected to the inlet; and
 an outflow path connected to the outlet.

6. The gas chromatograph according to claim 5, wherein the inflow path and the outflow path are included in a split flow path.

* * * * *